US007819735B2

(12) United States Patent
Ottofy

(10) Patent No.: US 7,819,735 B2
(45) Date of Patent: Oct. 26, 2010

(54) SYSTEM AND METHOD FOR PLAYING A TEAM GAMING TOURNAMENT

(76) Inventor: Glyn Ottofy, 8133 Bay Harbor Dr., Las Vegas, NV (US) 89128

( * ) Notice: Subject to any disclaimer, the term of this patent is extended or adjusted under 35 U.S.C. 154(b) by 1654 days.

(21) Appl. No.: 10/705,310

(22) Filed: Nov. 10, 2003

(65) Prior Publication Data

US 2005/0102047 A1 May 12, 2005

(51) Int. Cl.
*A63F 13/00* (2006.01)

(52) U.S. Cl. .............................. 463/13; 463/11; 463/42

(58) Field of Classification Search ............. 463/11–13, 463/17–20, 42
See application file for complete search history.

(56) References Cited

U.S. PATENT DOCUMENTS

| | | | | |
|---|---|---|---|---|
| 5,755,621 | A * | 5/1998 | Marks et al. | 463/42 |
| 5,897,436 | A * | 4/1999 | Singer et al. | 273/293 |
| 6,142,872 | A * | 11/2000 | Walker et al. | 463/16 |
| 6,206,782 | B1 * | 3/2001 | Walker et al. | 463/25 |

* cited by examiner

*Primary Examiner*—James S McClellan
(74) *Attorney, Agent, or Firm*—Craig Weiss; Jeffrey Weiss; Weiss & Moy, P.C.

(57) ABSTRACT

A system and method for playing a team gaming tournament that allows players to form teams of one or more players in order to allow a team's performance in a gaming tournament to be dependent on both the performance of each individual member of the team as well as the number of players on each team.

7 Claims, 1 Drawing Sheet

SYSTEM AND METHOD FOR PLAYING A TEAM GAMING TOURNAMENT

FIELD OF THE INVENTION

This invention relates generally to card game tournaments and systems therefor and, more particularly, to a method and system for playing a team gaming tournament that allows players the opportunity to form teams of one or more players in order to allow a team's performance in a card game tournament to be dependent on both the performance of each individual member of the team as well as the number of players on each team.

BACKGROUND OF THE INVENTION

Gaming tournaments, such as poker tournaments are a very popular form of both entertainment and gambling. The World Series of Poker, watched by millions every year on television, is the most famous of all gaming tournaments. In this event, hundreds of poker players enter the tournament and play against one another for millions of dollars in prize money until only one player remains. Most poker and other gaming tournaments feature this same basic format, wherein each player, is out of the tournament once eliminated and may or may not be compensated based on that individual player's overall performance (or placement finish).

In recent years, there has been tremendous growth in the area of internet poker tournaments. In this new venue, players from around the world can play in a gaming tournament without the need to be physically present in the same room. Nevertheless, the websites that offer internet gaming tournaments invariably follow the same format as the live gaming tournaments. Often, the main differences between live play and internet play is merely the number of overall players involved in the tournament and the players' physical location. Many poker players thoroughly enjoy and even prefer playing in a poker tournament over playing poker in a non-tournament environment. The popularity of poker tournaments is often due to the potential for large monetary awards for a high placement finish as well as the relatively low cost of entering the tournament. This is especially true of internet poker tournaments, where entrance fees are typically lower than live poker tournaments.

Regardless of the venue however, once a player is eliminated from the tournament his or her interest in the outcome of the tournament is either greatly reduced or eliminated altogether. It is often the case that once eliminated from a tournament, the player will either leave the casino or leave the website. The primary reason for this lack of interest in the outcome is that the moment a player has been eliminated from a tournament their placement finish and equivalent financial award (if any) is determined immediately. There is simply no financial or competitive incentive to wait around.

A need therefore existed for a new method for playing a team gaming tournament that allows players the opportunity to form teams of one or more players in order to allow a team's performance in a card game tournament to be dependent on both the performance of each individual member of the team as well as the number of players on each team so that once an individual player is eliminated from a tournament that player still has a personal interest in the outcome of the tournament based on the performance of his or her teammates.

SUMMARY OF THE INVENTION

An object of the present invention is to provide a new method for playing a team gaming tournament that allows players the opportunity to form teams of one or more players in order to allow a team's performance in a card game tournament to be dependent on both the performance of each individual member of the team as well as the number of players on each team.

It is a further object of the present invention to provide a new method for playing a gaming tournament over a computer network including a server and a plurality of end-user computers coupled to the server via a network connection wherein the end-user computer has a graphical display portion adapted to display a browser window so that a game of the gaming tournament can be displayed in the browser window and a plurality of users can form a plurality of teams of one or more users to play in the gaming tournament by sending user input from the plurality of users to the server, and the placement finish for each team of the plurality of teams in the gaming tournament is dependent on both a number of users on each team and each individual user's performance.

It is yet a further object of the present invention to provide a server for providing a computer gaming tournament having memory and a processor to execute the memory of program instructions for a computer gaming tournament that allows users the opportunity to form teams of one or more users in order to allow a team's performance in a card game tournament to be dependent on both the performance of each individual user as well as the number of users on each team.

BRIEF DESCRIPTION OF THE PREFERRED EMBODIMENTS

In accordance with one embodiment of the present invention, a method for playing a team gaming tournament is disclosed, comprising, in combination, the steps of permitting a plurality of players to enter a gaming tournament, forming a plurality of teams of at least one player from the plurality of players entered in the gaming tournament, and calculating a placement finish for each of the plurality of teams in the gaming tournament in conformity with a predetermined formula having a dependence on both a number of players on each of the plurality of teams and a performance of each the plurality of players.

In accordance with another embodiment of the present invention, a method for playing a team gaming tournament is disclosed comprising, in combination, the steps of providing a computer network including a server and at least one end-user computer coupled to the server via a network connection, wherein the end-user computer has a graphical display portion adapted to display a browser window, displaying a game of a gaming tournament in the browser window, permitting a plurality of users to enter the game of the gaming tournament, forming a plurality of teams of at least one user from the plurality of users entered in the gaming tournament, sending user input from the plurality of users to the server, and calculating a placement finish for each of the plurality of teams in the gaming tournament in conformity with a predetermined formula having dependence on both a number of users on each of the plurality of teams and a performance of each the plurality of users.

In accordance with yet another embodiment of the present invention, a server for providing a computer gaming tournament is disclosed comprising, in combination, a memory for storing program instructions and data, a processor coupled to the memory for executing the program instructions, wherein the program instructions include program instructions for: displaying a browser window, displaying a game of a gaming tournament in the browser window, permitting a plurality of users to enter the game of the gaming tournament, forming a plurality of teams of at least one user from the plurality of users entered in the gaming tournament, receiving indications of user input from a plurality of user computers, and calculating a placement finish for each the plurality of teams in the gaming tournament in conformity with a predetermined formula having dependence on both a number of users on each the plurality of teams and a performance of each the plurality of users.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

Figure 1:
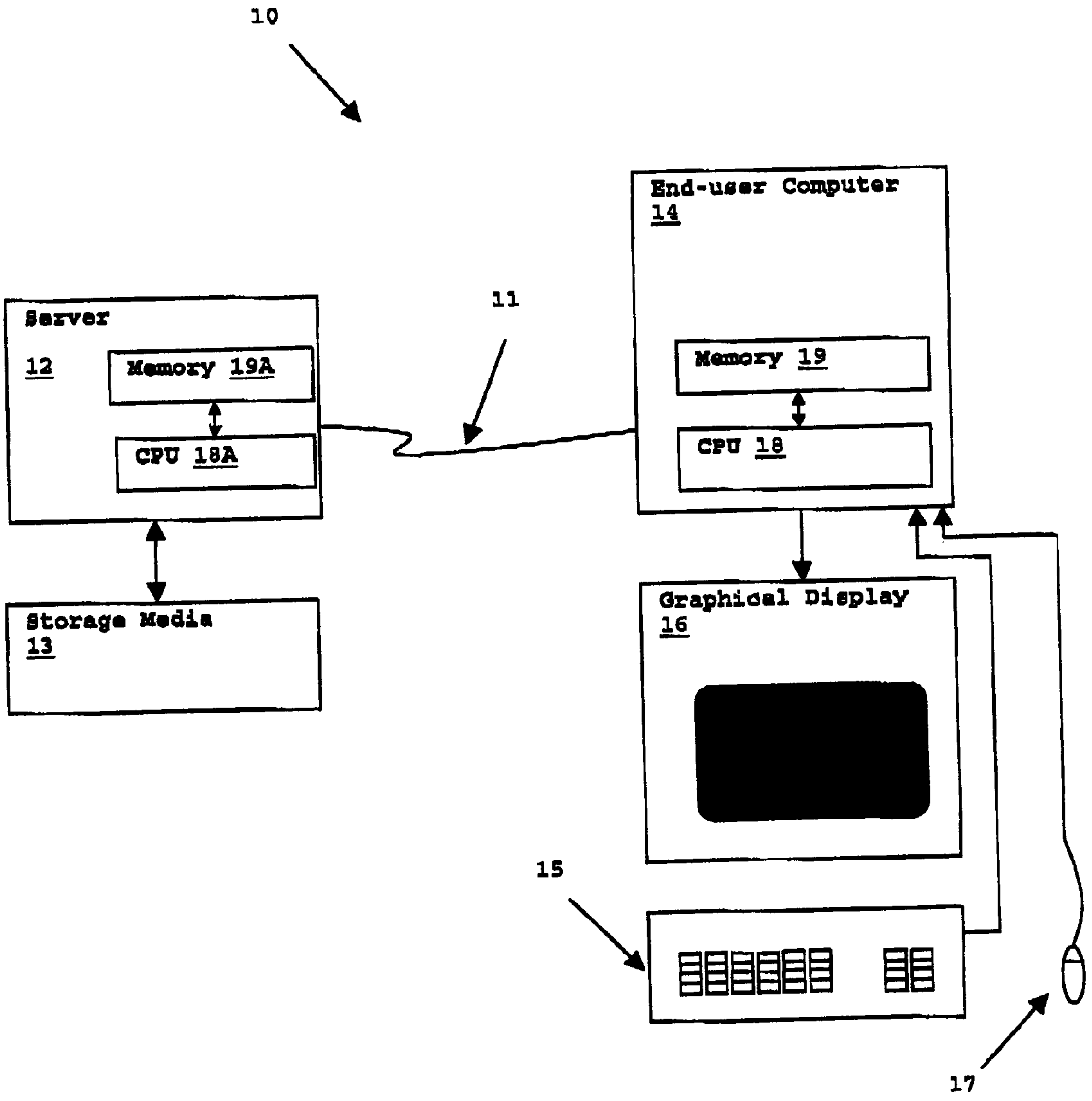
FIG. 1 is a block diagram depicting a networked computer system in which embodiments of the invention may be practiced.

The present invention includes both a method and system (shown in FIG. 1) for playing a team gaming tournament. In the preferred embodiment, the gaming tournament is managed by a live or internet casino and is a poker gaming tournament, such as Texas Hold'em, Seven Card Stud Hi, Seven Card Stud Hi/Low, Five Card Stud, Omaha Hi, and Omaha Hi/Low, however, it should be clearly understood that substantial benefit could be derived from an alternative embodiment of the present invention in which a game other than the aforementioned poker games is played and/or in which the tournament is not managed by a casino or casino equivalent.

The first step in the method for playing a team gaming tournament comprises permitting a plurality of players to enter a gaming tournament. The players then form teams of one or more players. Preferably, the players decide with whom they would like to be teammates, although it should be clearly understood that substantial benefit could be derived from an alternative configuration of the present invention, in which a tournament director, random number generator or some other means determine which player is assigned to which team. Finally, a placement finish is calculated for each team in conformity with a predetermined formula having a dependence on both a number of players on each team and each individual player's performance.

This placement finish may be calculated by a tournament director, a computer program, or some other manner.

In the preferred embodiment, the placement finish is calculated by first assigning a finish number (FN) to each individual player from the plurality of players entered in the gaming tournament. The FN preferably is equivalent to the order that the player is eliminated from the tournament relative to the other players. For example, if 100 players are entered in a tournament, then the first person to be eliminated would have an FN of 1 and the winner of the tournament would have an FN of 100 (It should also be noted that it is possible to give the first person to be eliminated an FN of 0 and the winner of a tournament having 100 players an FN of 99). After assigning each individual player a finish number, each team is preferably assigned a finish equalization number (FEN). The FEN is equivalent to a maximum number of players allowed per team divided by an actual number of players on the team. For example, if the tournament allows 5 players per team, then a team having 5 players would have an FEN of 1 (5 divided by 5) whereas a team having only 2 players in the same tournament would have an FEN of 2.5 (5 divided by 2), and a team having only 1 player would have an FEN of 5 (5 divided by 1). If no maximum number of players is delineated in the gaming tournament, then the FEN of each team would be determined by dividing the number of players on the team having the largest number of teammates by the actual number of players on a given team. After the assignment of the finish number (FN) to each individual player and the finish equalization number (FEN) to each individual team, an equalization number (EN) is assigned to each individual player. The EN is simply the multiplication of a player's FN and that player's team's FEN. For example, for a tournament of 100 people that allows a maximum of 5 players per team, a player who is eliminated $8^{th}$ in the tournament on a team with only one other player would have an EN of 20 (8×2.5). Finally, a placement finish for each team is determined by the summation of all equalization numbers for the players on a particular team. For example, in the immediate example above, if the player with an EN of 20 had a teammate who was the $80^{th}$ person to be eliminated from the tournament, then that teammate would have an EN of 200, and the team's total placement finish would be 220 (200+20).

Referring now to Table 1, an example of a 10-team tournament in which a maximum of 3 players are allowed per team is shown. In this example, there are 10 teams, three of which having 3 players each, four of which having 2 players each, and three teams having 1 player each for a total of 20 individual players. Table 1 lists the finish equalization number (FEN) for each team, the finish number (FN) for each player and the equalization number (EN) for each individual player. The EN total is equivalent to the overall placement finish for each team.

TABLE 1

| Team | Players | FEN | FN | EN | EN Total | Place |
|---|---|---|---|---|---|---|
| 1 | 1 | 1 | 19 | 19 | 42 | Tie for |
| | 2 | | 3 | 3 | | 2nd |
| | 3 | | 20 | 20 | | |
| 2 | 1 | 1 | 12 | 12 | 42 | Tie for |
| | 2 | | 17 | 17 | | 2nd |
| | 3 | | 13 | 13 | | |
| 3 | 1 | 1 | 8 | 8 | 33 | |
| | 2 | | 18 | 18 | | |
| | 3 | | 7 | 7 | | |
| 4 | 1 | 1.5 | 4 | 6 | 27 | |
| | 2 | | 14 | 21 | | |
| 5 | 1 | 1.5 | 9 | 13.5 | 37.5 | 4th Place |
| | 2 | | 16 | 24 | | |
| 6 | 1 | 1.5 | 5 | 7.5 | 24 | |
| | 2 | | 11 | 16.5 | | |
| 7 | 1 | 1.5 | 1 | 1.5 | 16.5 | |
| | 2 | | 10 | 15 | | |
| 8 | 1 | 3 | 15 | 45 | 45 | Winner |
| 9 | 1 | 3 | 6 | 18 | 18 | |
| 10 | 1 | 3 | 2 | 6 | 6 | |

Referring now to Table 2, an example of a 15-team tournament in which a maximum of 6 players are allowed per team is shown. Once again, the number of players per team vary from 1 (the minimum number) to 6 (the maximum number allowed in this example tournament).

TABLE 2

| Team | Players | FEN | FN | EN | EN Total | Place |
|---|---|---|---|---|---|---|
| 1 | 1 | 1 | 20 | 20 | 171 | |
| | 2 | 1 | 3 | 3 | | |
| | 3 | 1 | 34 | 34 | | |
| | 4 | 1 | 16 | 16 | | |
| | 5 | 1 | 43 | 43 | | |
| | 6 | 1 | 55 | 55 | | |
| 2 | 1 | 1 | 27 | 27 | 204 | Winner |
| | 2 | 1 | 12 | 12 | | |
| | 3 | 1 | 40 | 40 | | |
| | 4 | 1 | 45 | 45 | | |
| | 5 | 1 | 26 | 26 | | |
| | 6 | 1 | 54 | 54 | | |
| 3 | 1 | 1 | 1 | 1 | 194 | 3 tie for 2nd |
| | 2 | 1 | 44 | 44 | | |
| | 3 | 1 | 41 | 41 | | |
| | 4 | 1 | 13 | 13 | | |
| | 5 | 1 | 42 | 42 | | |
| | 6 | 1 | 53 | 53 | | |
| 4 | 1 | 1.2 | 2 | 2.4 | 113 | |
| | 2 | 1.2 | 28 | 33.6 | | |
| | 3 | 1.2 | 17 | 20.4 | | |
| | 4 | 1.2 | 14 | 16.8 | | |
| | 5 | 1.2 | 52 | 62.4 | | |
| 5 | 1 | 1.2 | 7 | 8.4 | 116 | |
| | 2 | 1.2 | 29 | 34.8 | | |
| | 3 | 1.2 | 8 | 9.6 | | |
| | 4 | 1.2 | 21 | 25.2 | | |
| | 5 | 1.2 | 51 | 61.2 | | |
| 6 | 1 | 1.5 | 35 | 52.5 | 153 | |
| | 2 | 1.5 | 6 | 9 | | |
| | 3 | 1.5 | 15 | 22.5 | | |
| | 4 | 1.5 | 46 | 69 | | |
| 7 | 1 | 1.5 | 19 | 28.5 | 166.5 | |
| | 2 | 1.5 | 9 | 13.5 | | |
| | 3 | 1.5 | 36 | 54 | | |
| | 4 | 1.5 | 47 | 70.5 | | |
| 8 | 1 | 1.5 | 5 | 7.5 | 174 | |
| | 2 | 1.5 | 38 | 57 | | |
| | 3 | 1.5 | 25 | 37.5 | | |
| | 4 | 1.5 | 48 | 72 | | |
| 9 | 1 | 2 | 30 | 60 | 194 | 3 way tie 2nd |
| | 2 | 2 | 18 | 36 | | |
| | 3 | 2 | 49 | 98 | | |
| 10 | 1 | 2 | 10 | 20 | 194 | 3 way ti 2nd |
| | 2 | 2 | 37 | 74 | | |
| | 3 | 2 | 50 | 100 | | |
| 11 | 1 | 2 | 24 | 48 | 122 | |
| | 2 | 2 | 33 | 66 | | |
| | 3 | 2 | 4 | 8 | | |
| 12 | 1 | 3 | 23 | 69 | 186 | |
| | 2 | 3 | 39 | 117 | | |
| 13 | 1 | 3 | 11 | 33 | 126 | |
| | 2 | 3 | 31 | 93 | | |
| 14 | 1 | 6 | 22 | 132 | 132 | |
| 15 | 1 | 6 | 32 | 192 | 192 | 5th place |

Table 3 represents a 15-team tournament of 30 players in which a maximum of 3 players are allowed per team. In the gaming tournament represented in Table 3, however, only the top 10 placement finishes are counted. In other words, in this 30-person tournament the first 20 players to be eliminated receive Finish Numbers of zero. Therefore, regardless of the Finish Equalizatation Number, the Equalization Number for each of the first 20 players to be eliminated will be zero. Since only the top 10 players are counted, in the tournament described in Table 3, a first place finish will have an individual Finish Number of 10 and the person who is the $21^{st}$ player overall to be eliminated, will receive an individual Finish Number of 1 (the first person to be eliminated among the top 10 players to place). While, in the embodiment of the team gaming tournament of the present invention described in Table 3, finish numbers are assigned only to the top ten finishers, it should be clearly understood that substantial benefit could be derived from an alternative configuration of the present invention in which either all players are assigned a finish number equivalent to the order that the player is eliminated from the tournament or only a pre-determined number of finish numbers are assigned for top placement finishes in a tournament. For example, in a tournament with a 150 people, perhaps only players finishing in the top 20 will receive finish numbers and therefore qualify for a possible monetary award or perhaps all 150 players will receive finish numbers.

TABLE 3

| Team | Players | FEN | FN | EN | EN Total | Place |
|---|---|---|---|---|---|---|
| 1 | 1 | 1 | 6 | 6 | 16 | 2nd place |
| | 2 | 1 | 10 | 10 | | |
| | 3 | 1 | 0 | 0 | | |
| 2 | 1 | 1 | 0 | 0 | 7 | |
| | 2 | 1 | 0 | 0 | | |
| | 3 | 1 | 7 | 7 | | |
| 3 | 1 | 1 | 0 | 0 | 0 | |
| | 2 | 1 | 0 | 0 | | |
| | 3 | 1 | 0 | 0 | | |
| 4 | 1 | 1 | 0 | 0 | 0 | |
| | 2 | 1 | 0 | 0 | | |
| | 3 | 1 | 0 | 0 | | |
| 5 | 1 | 1 | 0 | 0 | 0 | |
| | 2 | 1 | 0 | 0 | | |
| | 3 | 1 | 0 | 0 | | |
| 6 | 1 | 1.5 | 3 | 4.5 | 4.5 | |
| | 2 | 1.5 | 0 | 0 | | |
| 7 | 1 | 1.5 | 8 | 12 | 12 | 3rd place |
| | 2 | 1.5 | 0 | 0 | | |
| 8 | 1 | 1.5 | 0 | 0 | 6 | |
| | 2 | 1.5 | 4 | 6 | | |
| 9 | 1 | 1.5 | 0 | 0 | 0 | |
| | 2 | 1.5 | 0 | 0 | | |
| 10 | 1 | 1.5 | 5 | 7.5 | 7.5 | 4th place |
| | 2 | 1.5 | 0 | 0 | | |
| 11 | 1 | 3 | 0 | 0 | 0 | |
| 12 | 1 | 3 | 1 | 3 | 3 | |
| 13 | 1 | 3 | 9 | 27 | 27 | Winner |
| 14 | 1 | 3 | 0 | 0 | 0 | |
| 15 | 1 | 3 | 2 | 6 | 6 | |

While, in the preferred embodiment, a finish number (FN) is assigned to each player, a finish equalization number (FEN) is assigned to each team, and the FN and FEN are multiplied to create an equalization number (EN), and the team's placement finish is determined by adding together each team member's EN, it should be clearly understood that substantial benefit could be derived from an alternative configuration of the present invention in which a formula other than the one previously described is used, so long as that formula allows for the placement finish of each team to be dependent on both a number of players on each team and each individual player's performance.

In the preferred embodiment, the team gaming tournament requires either each individual player or each individual team (or both) to pay an entrance fee in order to enter the tournament. Awards (preferably monetary) are paid out to a pre-determined number of teams or players based on those teams or individuals performance and preferably the awards are calculated to be a pre-determined percentage of the pool of entrance fees collected. In one embodiment, a pre-determined percentage of awards are paid to individuals (teams having only 1 player) and a pre-determined percentage of awards are paid to teams (teams having 2 or more players).

In another embodiment, a pre-determined percentage of awards are paid to individuals within teams based on their performance and a pre-determined percentage of awards are paid to teams based on team performance. For example, a player on a team with 4 teammates who wine the tournament would receive not only an award based on his individual performance from the pre-determined percentage of the award pool designated for individuals, but may also qualify for an additional award from the pre-determined percentage of the award pool designated for teams if his or her team qualified for an award. Tournament directors may require teammates to split team awards: 1) evenly; 2) based on each teammate's performance; 3) at the discretion of the teammates; or 4) by some other means for determining team share. Additionally, other percentage breakdowns are possible by which preference can be given to larger or smaller teams. While, in the preferred embodiment, the team gaming tournament of the present invention is practiced for gambling purposes it should be clearly understood that it is within the spirit and scope of this invention that the team gaming tournament be practiced for non-gambling or charitable purposes. Although it is assumed that the tournament is organized and run by a casino or casino-type organization for profit, it should be clearly understood that substantial benefit could be derived from an alternative embodiment of the present invention in which the team gaming tournament of the present invention is organized as a charity event in which all proceeds are donated to a pre-determined charity (or charities) or to a charity represented by a team. For example, a charity could sponsor a team, or a team could simply choose to have an award donated to the charity of their choosing. Additionally, substantial benefit could be derived from non-charitable, but nevertheless non-profit uses for the method of the present invention, such as neighborhood leagues, and other types of "friendly" tournament play.

The team gaming tournament of the present invention should be understood to be practiced both in live tournament play as well as over a computer network, such as the Internet. Referring now to FIG. 1, a system 10 in which embodiments of the present invention may be practiced is depicted in a block diagram. A server 12 is coupled to a signal-bearing media in the form of hard disk storage 13 having program instructions for practicing portions of a method in accordance with an embodiment of the present invention that are loaded into a memory 19A and executed by one or more central processing units 18A (CPU). Server 12 is coupled to at least one end-user computer 14 via a network connection 11, which may be an Ethernet connection coupled to routers, bridges or other terminal equipment for connection to a wide-area network, and thereby to the Internet. Alternatively, network connection may be a modem, DSL or cable modem connection coupled to at least one end-user computer 14 for direct connection to the Internet as is typical in home installations. As such, network connection 11 represents a connection to the Internet or other suitable platform for connection to remote systems such as a server 12. The present invention uses the network depicted in FIG. 1 to remotely deliver a computer gaming tournament in response to activity of a browser executed by a processor (CPU) 18 from a memory 19 within at least one end-user computer 14. A user having access to end-user computer 14 coupled to network connection 11 is permitted to form a team of one or more users for the purpose of playing in a gaming tournament, the user indicates to the server 12 through the network connection 11 the actions of the user in the gaming tournament, and the placement finish for each team is calculated in conformity with a predetermined formula having dependence on both a number of users on each team and each individual user's performance.

End-user computer 14 is coupled to a graphical display 16 and input devices such as a keyboard 15 and mouse 17 providing interactivity with the browser program in order to provide access to the world-wide-web (WWW). Server 12 is accessed via the program of the present invention and may also be accessed directly by browser through the main browser window.

While the invention has been particularly shown and described with reference to preferred embodiments thereof, it will be understood by those skilled in the art that the foregoing and other changes in form and details may be made therein without departing from the spirit and scope of the invention.

I claim:

1. A server for providing a computer gaming tournament, comprising, in combination:

a memory for storing program instructions and data;

a processor coupled to said memory for executing said program instructions, wherein said program instructions include program instructions for:

displaying a browser window;

displaying a live game of a poker gaming tournament in said browser window;

permitting a plurality of users to enter said game of said gaming tournament to play against one another;

forming a plurality of teams of at least one user from said plurality of users entered in said gaming tournament;

receiving indications of user input from a plurality of user computers;

calculating a placement finish for each said plurality of teams in said gaming tournament in conformity with a predetermined formula having dependence on both a number of users on each said plurality of teams and a performance of each said plurality of users;

assigning a finish number to each said plurality players, said finish number being equivalent to an order that each said plurality of users is eliminated from said tournament relative to other said plurality of users;

assigning a finish equalization number to each said plurality of teams, said finish equalization number being equivalent to a maximum number of users allowed per each said plurality of teams divided by an actual number of users per each said plurality of teams;

assigning an equalization number to each said plurality of users, said equalization number being equivalent to a multiplication of said finish number of each said plurality of users of a team and said finish equalization number of said team; and calculating a placement finish, wherein each said plurality of teams having a placement finish equivalent to a sum of said equalization number for each of said plurality of users of each said plurality of teams, wherein a higher number corresponds to a higher team placement finish.

2. The server of claim 1 wherein said program instructions further comprise program instructions for assigning said finish number only to each said plurality of users finishing in a predetermined number of places in said gaming tournament.

3. The server of claim 1 wherein said program instructions further comprise program instructions for:

receiving an entrance fee from at least one of said plurality of users and said plurality of teams in order for each said plurality of teams to enter said gaming tournament; and paying at least one of said plurality of teams and at least one of said plurality of users an award in conformity with at least one of a performance of each said plurality of teams and a performance of each said plurality of users, said award in conformity with a percentage of a total amount of said entrance fees received.

4. The server of claim 3 wherein said program instructions further comprise program instructions for:

paying a predetermined amount of said percentage as an award to teams having at least two users; and paying a predetermined amount of said percentage as an award to teams having one user.

5. The server of claim 1 wherein said program instructions further comprise program instructions for said poker tournament comprising at least one poker game of at least one of Texas Hold'em, Seven Card Stud Hi, Seven Card Stud Hi/Low, Five Card Stud, Omaha Hi, and Omaha Hi/Low.

6. The server of claim 1 wherein said program instructions further comprise program instructions for requiring each said plurality of teams to comprise a predetermined minimum number of users.

7. The server of claim 1 wherein said program instructions further comprise program instructions for limiting each said plurality of teams to a predetermined maximum number of users.

* * * * *